United States Patent [19]

Matsubara

[11] Patent Number: 4,492,406

[45] Date of Patent: Jan. 8, 1985

[54] RETRACTABLE AIR DEFLECTOR

[75] Inventor: Tooru Matsubara, Hiratsuka, Japan

[73] Assignee: Nissan Shatai Co., Ltd., Japan

[21] Appl. No.: 490,669

[22] Filed: May 2, 1983

[30] Foreign Application Priority Data

Dec. 29, 1982 [JP] Japan .................. 57-229588

[51] Int. Cl.³ .............................................. B60J 7/22
[52] U.S. Cl. ................................................. 296/217
[58] Field of Search ........................................ 296/217

[56] References Cited

U.S. PATENT DOCUMENTS

| 3,156,175 | 11/1964 | Werner | 296/217 |
| 4,268,085 | 5/1981 | Sakai | 296/217 |
| 4,342,481 | 8/1982 | Kanou | 296/217 |
| 4,380,351 | 4/1983 | Sorensen et al. | 296/217 |

Primary Examiner—Robert R. Song
Attorney, Agent, or Firm—Hayes, Davis & Soloway

[57] ABSTRACT

Disclosed is a retractable air deflector for an automobile with an open top which can be automatically stowed away into a relatively narrow trough extending along the front periphery of the open top as a natural result of closing the open top with a detachable roof and can automatically project out into its operative state upon removal of the detachable roof. Thus not only the noises often produced in an automobile with an open top running at certain high speed due to the air turbulance caused around the open top is eliminated but also the inconvenience of separately putting up an air deflector and stowing it away each time a detachable roof is removed and mounted from and to the open top of the automobile is eliminated.

5 Claims, 12 Drawing Figures

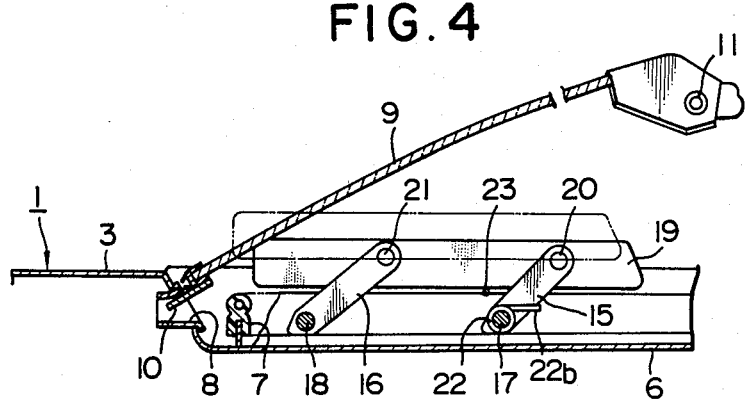
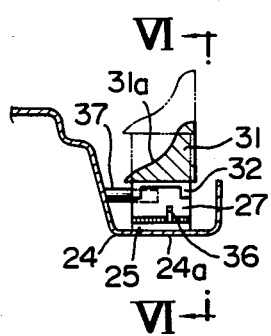
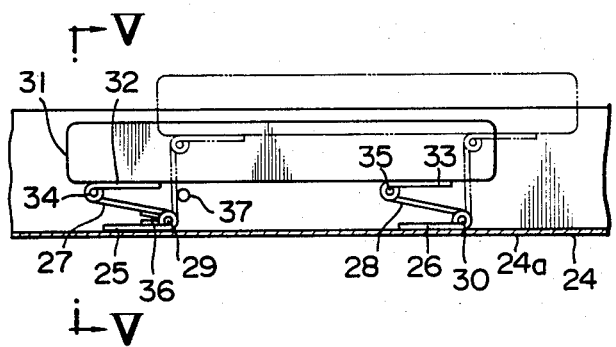
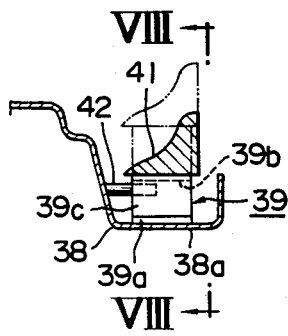
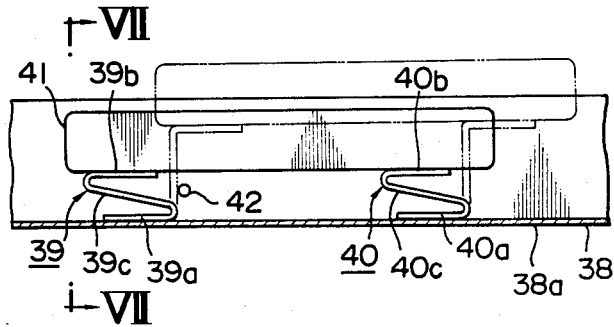

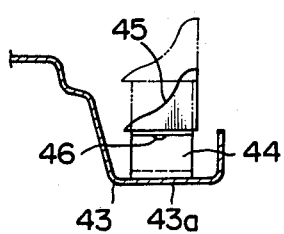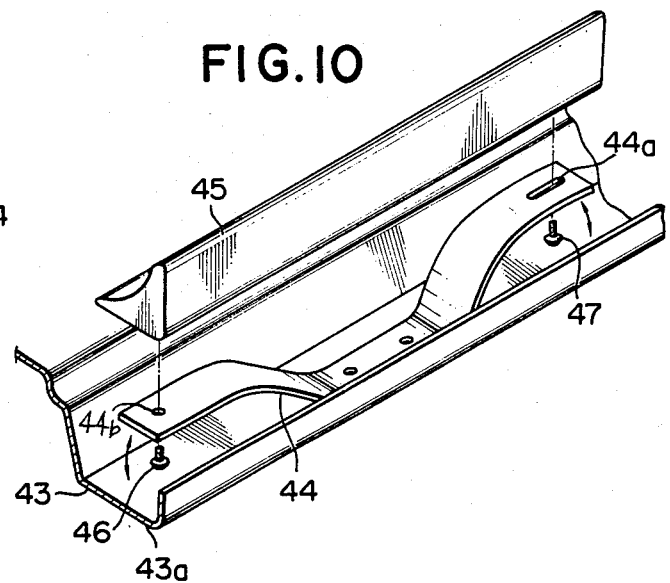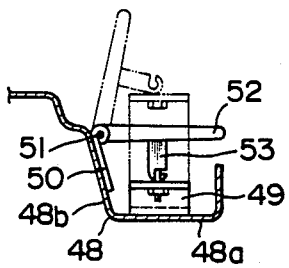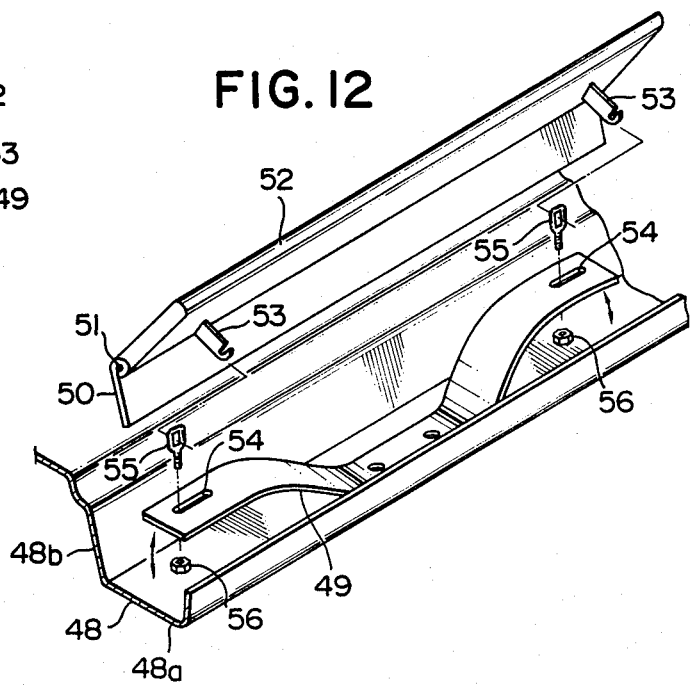

RETRACTABLE AIR DEFLECTOR

This invention relates to a retractable air deflector and in particular to a retractable air deflector for an automobile with a detachable roof.

In an automobile with a detachable roof running at certain high speed with open top, air turbulence is generated around the automobile body due to the presence of an opening above the passenger compartment and this often causes undesirable noises.

It is known that such noises may be substantially suppressed by providing an air deflector on the front end of the opening formed above the passenger compartment. Such an air deflector is normally comprised of a laterally extending plate with a slight upward inclination toward the rear. However, such an air deflector is not only unnecessary when the opening is covered by a detachable roof but also create the problems of undesirable appearance and unnecessary aerodynamic drag on the otherwise smooth automobile top.

It have thus been proposed to use a retractable air deflector which may be stowed away when the detachable roof is mounted on top of the automobile.

One of the prior retractable air deflectors is adapted to be mounted on a sun visor in such a manner that the air deflector may be retracted in parallel onto the sun visor and, when in use, may be pulled out from the sun visor and engaged to the front end of the opening formed above the passenger compartment in an upwardly projecting manner relative to the fixed portion of the automobile top.

However, this conventional retractable air deflector has disadvantages in that the sun visor becomes so great in thickness and weight that its handling as a sunvisor becomes highly inconvenient and that the retracting and putting-up of the air deflector must be repeated every time the detachable roof is mounted and removed.

Another conventional retractable air deflector is pivoted to the front end of the opening above the passenger compartment at its front end so that it may be stowed away by being folded rearward into a trough surrounding the opening like a hinge when not in use and may be put up under the biasing force of a spring means above the contour surface of the automobile top when in use.

However, this known retractable air deflector has disadvantages in that the trough must be wide enough to be able to accommodate the retracted air deflector, thereby reducing the effective area of the open top opening. Furthermore, when one inadvertently tries to mount a detachable roof over the open top without retracting the air deflector beforehand, the corners of the air deflector comes into contact with the detachable roof often causing damage to the detachable roof. Thus, according to this known retractable air deflector, one must be always careful when mounting the detachable roof if he has not forgotten to retract the air deflector, causing a great inconvenience to the user.

In view of such inconveniences and disadvantages of conventional retractable air deflectors, a primary object of this invention is to provide a retractable air deflector for an automobile with a detachable roof which is free from such disadvantages and inconveniences.

More specifically, a primary object of this invention is to provide such a retractable air deflector which is automatically set into a retracted state as a natural result of closing a detachable roof when mounting it and again automatically projects out into its operative state upon removal of the detachable roof thus eliminating any need for separately retracting and putting up the air deflector.

Another object of this invention is to provide a retractable air deflector which can be mounted in a relatively narrow trough and retracted into the same trough without substantially limiting the area of the open top when the detachable roof is removed.

Yet another object of this invention is to provide a retractable air deflector which is highly effective in eliminating the noises which the open top of the automobile causes when the automobile is running at certain high speed.

Now this invention is described in the following in regards to its specific embodiments with reference to the appended drawings, in which:

FIG. 4 is a lateral sectional view of the T-bar roof of FIG. 1 when a detachable roof is being mounted;

FIG. 5 is a longitudinal sectional view showing a second embodiment of this invention, taken along line V—V of FIG. 6;

FIG. 6 is a lateral sectional view of the air deflector of FIG. 5 taken along line VI—VI of FIG. 5;

FIG. 7 is a longitudinal sectional view of a third embodiment taken along line VII—VII of FIG. 8;

FIG. 8 is a lateral sectional view of the air deflector of FIG. 7 taken along line VIII—VIII of FIG. 7;

FIG. 9 is an end view of a fourth embodiment of this invention;

FIG. 10 is a perspective view of the air deflector of FIG. 9;

FIG. 11 is an end view of a fifth embodiment of this invention;

FIG. 12 is a perspective view of the air deflector of FIG. 11.

FIGS. 1 to 4 show the first embodiment of this invention.

Figure 1:
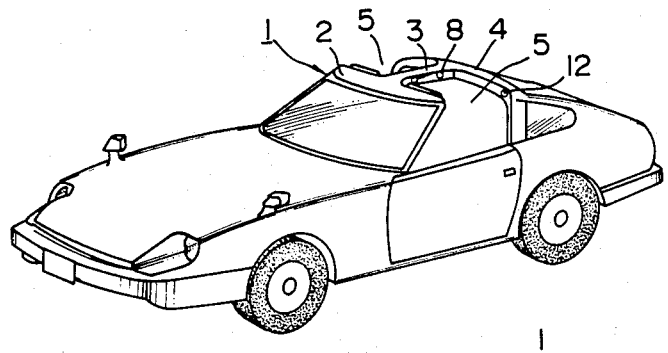
FIG. 1 is a perspective view of an automobile with a so-called "T-bar roof" which may be closed with a detachable roof and is equipped with a retractable air deflector according to this invention.

In FIG. 1, numeral 1 denotes an automobile top of an automobile with a so called T-bar roof comprised of a fixed front portion 2, a fixed central portion 3 and a fixed rear portion 4 and a pair of substantially rectangular openings 5 are defined along each side of the fixed central portion 3.

Along the inner periphery of the openings 5 is provided a trough 6 having a substantially U-shaped cross section with an open top side, and an upwardly projecting weather strip 7 is secured along the inner periphery of the trough 9.

A pair of holes 8 whose diameter is slightly greater along the longitudinal direction than along the vertical direction are provided on each side end of the fixed central portion 3 of the automobile top 1.

A detachable roof 9 may be mounted on the automobile top 1 and closes the opening in the following manner. A pair of hooks 10 projecting from the inner side end of the detachable roof 9 is inserted into the holes 8 and the detachable roof 9 is closed upon the opening 5 with the hooks 10 engaged into the holes 8 acting as a hinge until snap pins 11 projecting from the front and the rear ends of the detachable roof 9 are fit into engagement holes 12 (FIG. 1) which are provided in corresponding places of the front and the rear portions of the automobile top 1.

When removing the detachable roof 9, the snap pins 11 are pulled inwardly by an appropriate lever (not shown in the drawings) provided inside the passenger compartment until the engagement between the snap pins 11 of the detachable roof 9 and the engagement holes 12 on the front and rear portions of the fixed automobile top 1 and, after pushing the laterally outward end of the detachable roof 9 upwards, the hooks 10 of the detachable roof 9 are disengaged from the corresponding engagement holes 12 so that the detachable roof 9 may be completely removed from the automobile top 1 and stowed away in a garage or in an appropriate place in the automobile.

Numeral 13 denotes a weather strip mounted on the periphery of the detachable roof 9.

Figure 2:
FIG. 2 is a perspective view of an embodiment of this invention as it is mounted on the front end of the left opening of the T-bar roof of FIG. 1.
Figure 3:
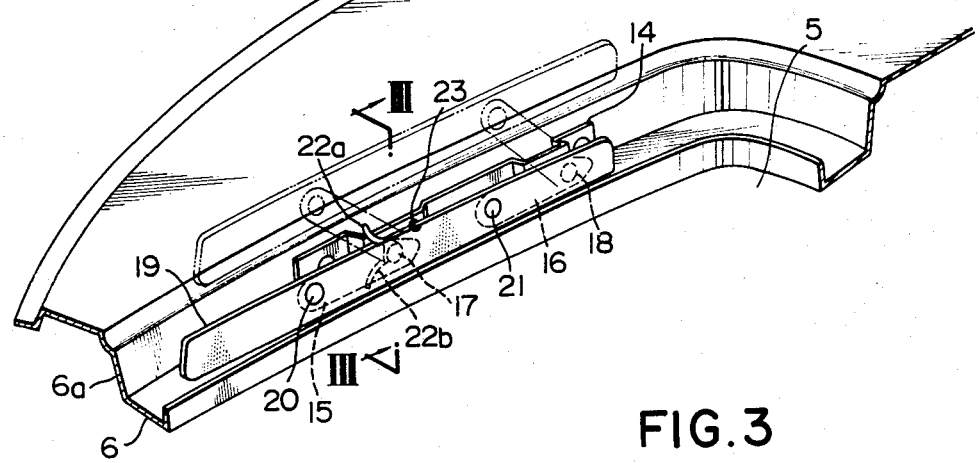
FIG. 3 is a sectional view taken along line III—III of FIG. 2.

As can be shown in FIGS. 2 and 3, a mounting bracket 14 is fixedly secured to the vertical wall 6a of the front portion of the trough 6 extending around the perimeter of the opening 5.

To this mounting bracket 14 are pivoted a pair of parallel links 15 and 16 by way of pivot pins 17 and 18, respectively. The other ends of the parallel links 15 and 16 are likewise pivoted to an air deflector 19 consisting of a laterally elongated and substantially vertical plate covered by a soft elastomer sheet 19a by way of pivot pins 20 and 21, respectively. This air deflector 19 is substantially parallel to the front end of the opening 5 and is slightly inclined toward the rear from the vertical plane.

Thus, a parallelogram link mechanism is formed by the parallel links 15 and 16, the air deflector 19 and the mounting bracket 14 so that the air deflector 19 can be moved from a retracted state as shown in solid lines in FIGS. 2 and 3 in which the air deflector 19 is completely accommodated within the trough 5 and to an operative state as shown in imaginery lines in FIGS. 2 and 3 in which the air deflector 19 protrudes above the contour of the automobile top 1, maintaining its parallel state relative to the mounting bracket 14 or the trough 5 throughout its motion.

A coil spring 22 is wound around one of the pivot pins 17 with an end of the coil spring 22 engaged to the mounting bracket 14 and the other end of the corresponding link 15. This coil spring 22 biases the link 15 towards its upright position and the air deflector 19 itself toward its operative state.

A stopper 23 fixedly mounted on the mounting bracket 14 stops on one of the links 15 to define the operative state of the air deflector 19 by preventing any further rotation of the link 15.

According to the first embodiment described above, the air deflector 19 deflects the flow of air coming along the fixed front portion 3 of the automobile top 1 upwards, whereby the flow of air is prevented from being thrown into the opening 5 and noises arising from the resultant air turbulence are effectively prevented.

According to the retractable air deflector of this first embodiment, the following advantages are offered:

1. Since the air deflector 19 is mounted on the fixed front portion 3 of the automobile top 1 by way of a parallelogram link mechanism, simply by engaging the hooks 10 of the detachable roof 9 to the engagement holes 8 of the fixed central portion 4 of the automobile top 1 with the detachable roof 9 inclined upwards relative its ultimately mounted position and closing the detachable roof 9 over the opening 5 with the hooks 10 engaged to the engagement holes 8 acting as a hinge, the air deflector 19 is pushed downward by the front end of the detachable roof 9 with the links 15 and 16 falling down in the same direction as the detachable roof falls down as a natural result of the closing motion of the detachable roof 9.

Hence, there is no need for separately folding or retracting the air deflector 19 before mounting the detachable roof 9, thereby eliminating not only the inconvenience of separately retracting the air deflector but also the risk of damaging the detachable roof 9 with a corner of the air deflector 19.

2. Since the air deflector automatically props up into its operative position under the biasing force of the coil spring 22 upon removal of the detachable roof 9 and there is no need for separately putting up the air deflector 19 after removing the detachable roof 9.

3. Since the air deflector 19 is retracted into the trough 6 in its substantially upright position, the trough 6 is not required to be as wide as in the case of a conventional retractable air deflector which has to be folded into the trough requiring the trough 6 to be wide enough to accommodate the substantially full width of the air deflector. However, according to this invention, the trough 6 is only required to be wide enough to accommodate the substantially full thickness of the air deflector 19 which is substantially smaller than its width and the effective area of the opening 5 is not substantially limited.

In the above described embodiment, the coil spring 22 was provided only on one of the parallel links 15 but the coil spring 22 may be provided for both the parallel links 15 and 16 and it is also possible to provide three or more parallel links.

FIGS. 5 and 6 illustrate a second embodiment of this invention.

In this embodiment, a pair of mounting brackets 25 and 26, which are made of thin plates, are securely attached to the bottom wall 24a of the trough 24 on the front end of the opening and one ends of a pair of links 27 and 27, which are likewise made of thin plates, are hinged to one ends of the mounting brackets 25 and 26, respectively. The other ends of the links 27 and 28 are in turn hinged by way of hinge pins 34 and 35 to support pieces 32 and 33 which are securely attached to the bottom wall of an air deflector 31 which has a substantially triangular cross section with a corner of a substantially right angle on the rear end of its bottom side, thus defining an upwardly slanting surface 31a on its front end. Substantially in the same manner as the coil spring 22 of the previous embodiment, a coil spring 26 is wound around one of the hinge pins 29 to bias one of the links 27 toward its upright position.

Numeral 37 denotes a stopper pin which is similar to the stopper pin 23 in the first embodiment.

This embodiment is otherwise identical to the first embodiment and further description is omitted for brevity's sake. And the second embodiment can produce substantially same advantages as the first embodiment.

FIGS. 7 and 8 show a third embodiment of this invention.

In the third embodiment, an air deflector 41 similar to the air deflector 31 of the second embodiment is mounted on the bottom wall 38a of a trough 38 on the front end of the opening by way of a pair of Z-shaped sheet springs 39 and 40. More specifically, the lower ends 39a and 40a of the sheet spring 39 and 40 are securely attached to the bottom wall 38a of the trough 38 and the other ends 39b and 40b of the sheet springs 39 and 40 are securely attached to the bottom wall of the air deflector 41.

Since these sheet springs 39 and 40 are adapted to produce a biasing effect to put up the intermediate portions 39c and 40c of the sheet springs 39 and 40, respectively, to stand upright and to fall down laterally outwardly under a downward force which exceeds the biasing force produced by the sheet springs 39 and 40 themselves, simply closing a detachable roof over the opening will push the air deflector 41 down into the trough 38 and removing the detachable roof automatically allows the air deflector 41 to rise up above the contour surface of the automobile top under the biasing force produced by the sheet springs 39 and 40 themselves.

A stopper pin 42 projecting rearwardly from the front wall of the trough 38 defines the operative position of the air deflector 41 in the same way as the stopper pin 37 of the second embodiment.

Otherwise, this embodiment is substantially identical to the previously described embodiments but the structure is considerably simplified since the air deflector 41 is supported on the bottom wall 38a of the trough 38 only by way of the sheet springs 39 and 40. This will produce the advantages of simplicity and economy of manufacture.

FIGS. 9 and 10 show a fourth embodiment of this invention.

In this embodiment, an air deflector 45 similar to the air deflectors 31 and 41 is mounted on the bottom wall 43a of the trough 43 by way of a single piece of sheet spring 44. This sheet spring 44 is substantially bow-shaped and has a circular hole 44b at one end and a longitudinally extending slot 44a at the other end. It is securely attached to the bottom wall 43a of the trough 43 at its middle portion and attached to the bottom wall of the air deflector by way of screws 46 and 47 passed through the hole 44b and the slot 44a.

Since this sheet spring 44 is substantially bow-shaped, the deflector 45 normally rises above the contour surface of the automobile top into its operative position. But, when the air deflector 45 is subjected to a force exceeding the restoring force of the sheet spring 44, the air deflector 45 may be pushed against the bottom 43a of the trough 43a with the sheet spring 44 stretched therebetween. The slot 44a allows this motion while guiding the screw 47 securely fastened to the bottom of the air deflector 45.

Otherwise, this retractable air deflector is substantially the same as the previously described embodiments. This embodiment provides advantages similar to those of the previously described embodiments and additionally offers the advantage of simplicity.

FIGS. 11 and 12 describe a fifth embodiment of this invention.

According to this embodiment, a sheet spring 49 similar to the sheet spring 44 of the fourth embodiment is securely mounted on the bottom wall 48a of the trough 48 at its middle part and loosely receives an end of a connector 54 which is shaped as a ring in its upper part and as a threaded rod at its lower end at each of slots 54 provided at the corresponding ends of the sheet spring 49. The threaded rod portion is engaged with a nut so that the rod part can move freely longitudinally relative to the sheet spring 49 over a certain distance defined by the slot 54 but would not come out from the slot 54.

Meanwhile, an air deflector 52 shaped as an elongated thin plate is hinged to the upper end of the mounting bracket 50, which is securely attached to the vertical wall 48b of the trough 48, by way of a hinge pin 51. A pair of hooks 53 are appended from the lower surface of the air deflector 52 and engaged with the ring parts of the connectors 53.

According to this fifth embodiment, the air deflectors 52 can rise above the contour surface of the automobile top under the biasing force from the sheet spring 49 on one hand and can be pushed down onto the bottom wall 48a of the trough 48 or into its retracted position on the other hand. The slots 54 accommodate the longitudinal motion of both the ends of the sheet spring 49 relative to the connectors 55 when the sheet spring 49 is being pushed down onto the bottom wall 48a of the trough 48.

It is thus apparent that, according to this invention, the retractable air deflector can move automatically between its operative position and retracted position upon mounting and removing of the detachable roof so that there is no need for separately putting up and retracting the air deflector. Therefore, the air deflector of this invention not only offers a greater convenience but also allows the trough extending around the peripery of the opening in the automobile top to be narrow enough to cause no substantial problem of limiting the area of the opening.

Although this invention was described in terms of specific embodiments, it is obvious to a person skilld in the art that there are a number of possible modifications and variations which in no way depart from the spirit of this invention. For instance, the opening in the automobile top was defined by a so-called T-bar roof but this invention is equally applicable to any type of vehicle top as long as an opening is defined by a fixed vehicle roof portion.

What is claimed is:

1. A retractable air deflector for an at least partially open automobile top, comprising:
    an air deflector member; and
    a support means supporting the air deflector member on the fixed automobile top on the front end of an opening in the automobile top; the support means being adapted to move the air deflector between an operative protruding above the contour surface of the automobile top and a retracted position submerged below the contour surface of the automobile top as a substantially parallel translation; the support means being so biased that the air deflection member is normally biased toward its operative position and may be pushed into its retracted position when the air deflector is subjected to a certain downward force which may be produced by pushing a detachable roof over the air deflector member and the opening of the automobile top; wherein the support means is comprised of at least a pair of parallel links which are pivoted to the air deflector member at their one ends and pivoted to a fixed automobile top on the front end of the opening in the automobile top.

2. A retractable air deflector according to claim 1, wherein one of the parallel links is so biased that the air deflector member is normally biased toward its operative position by a coil spring wound around a pivot pin of the one of the parallel links and engaged to the link at its one end and to the fixed automobile top at its other end.

3. A retractable air deflector for an at least partially open automobile top, comprising:
an air deflector member; and
a support means supporting the air deflector member on the fixed automobile top on the front end of an opening in the automobile top; the support means being adapted to move the air deflector between an operative protruding above the contour surface of the automobile top and a retracted position submerged below the contour surface of the automobile top as a substantially parallel translation; the support means being so biased that the air deflection member is normally biased toward its operative position and may be pushed into its retracted position when the air deflector is subjected to a certain downward force which may be produced by pushing a detachable roof over the air deflector member and the opening of the automobile top; wherein the support means is comprised of at least two Z-shaped sheet springs which are fixedly secured to the air deflector member at their one ends and to the fixed automobile top at their other ends in such a manner that the intermediate portions of the sheet springs normally bias the air deflector member toward its operative position and may fall sideways under a certain downward force applied to the air deflector member.

4. A retractable air deflector for an at least partially open automobile top, comprising:
an air deflector member; and
a support means supporting the air deflector member on the fixed automobile top on the front end of an opening in the automobile top; the support means being adapted to move the air deflector between an operative protruding above the contour surface of the automobile top and a retracted position submerged below the contour surface of the automobile top as a substantially parallel translation; the support means being so biased that the air deflection member is normally biased toward its operative position and may be pushed into its retracted position when the air deflector is subjected to a certain downward force which may be produced by pushing a detachable roof over the air deflector member and the opening of the automobile top; wherein the support means is comprised of a bow-shaped sheet spring which is fixedly attached to the fixed automobile top at its middle part and engaged to the air deflector member at its both ends and at least one of the ends of the sheet spring is movable longitudinally relative to the air deflector member by way of a slot provided in the sheet spring and a screw loosely passed through the slot and fixedly attached to the air deflector member.

5. A retractable air deflector according to claim 4, wherein the air deflector member is hinged to the fixed automobile top in such a manner that the air deflector is movable about a hinge axis substantially lateral to the automobile between its operative position and retracted position, said air deflector being also connected to the spring so as to be capable of being thrown down.

* * * * *